United States Patent
Melikyan et al.

(10) Patent No.: US 10,038,546 B2
(45) Date of Patent: Jul. 31, 2018

(54) METHOD AND APPARATUS FOR LOCKING WDM TRANSMITTER CARRIERS TO A DEFINED GRID

(71) Applicant: Alcatel Lucent USA, Inc., Murray Hill, NJ (US)

(72) Inventors: Argishti Melikyan, Freehold, NJ (US); Young-Kai Chen, Berkeley Heights, NJ (US); Po Dong, Morganville, NJ (US)

(73) Assignee: Nokia of America Corporation, Murray Hill, NJ (US)

( * ) Notice: Subject to any disclaimer, the term of this patent is extended or adjusted under 35 U.S.C. 154(b) by 0 days.

(21) Appl. No.: 15/298,319

(22) Filed: Oct. 20, 2016

(65) Prior Publication Data

US 2018/0115407 A1    Apr. 26, 2018

(51) Int. Cl.
H04J 14/02    (2006.01)
H04B 10/079   (2013.01)
H04L 7/00     (2006.01)

(52) U.S. Cl.
CPC .......... *H04L 7/0075* (2013.01); *H04J 14/021* (2013.01)

(58) Field of Classification Search
CPC .............................................. H04B 10/07957
See application file for complete search history.

(56) References Cited

U.S. PATENT DOCUMENTS

| | | | |
|---|---|---|---|
| 5,434,877 A * | 7/1995 | Chung | H04B 10/506 372/18 |
| 6,369,923 B1 * | 4/2002 | Kuo | H04B 10/504 398/91 |
| 6,919,963 B2 | 7/2005 | Park | |
| 7,200,296 B2 | 4/2007 | Kish, Jr. et al. | |
| 7,843,629 B2 | 11/2010 | Sorin et al. | |
| 8,532,441 B2 * | 9/2013 | Rasras | B29D 11/00663 372/20 |
| 8,611,750 B2 | 12/2013 | Lei et al. | |

(Continued)

FOREIGN PATENT DOCUMENTS

| | | |
|---|---|---|
| EP | 2 613 461 | 7/2013 |
| WO | WO 2012/064637 | 5/2012 |

OTHER PUBLICATIONS

Ichioka et al., Athermal wavelength lockers using fiber Bragg gratings, Proceedings of 2002 IEEE/LEOS Workshop on Fibre and Optical Passive Components (Cat.No. 02EX595), 2002, pp. 208-212. doi: 10.1109/FOPC.2002.1015828; URL: http://ieeexplore.ieee.org/stamp/stamp.jsp?tp=&arnumber=1015828&isnumber=21857.*

(Continued)

*Primary Examiner* — Nathan Cors
(74) *Attorney, Agent, or Firm* — The Capitol Patent & Trademark Law Firm, PLLC

(57) ABSTRACT

The locking of optical carriers to a grid can be achieved by employing an optical filter that exhibits athermal behavior in a frequency range to lock at least the frequency of a first channel to a target frequency. The locked frequency may be used to tune and lock the location of the free spectral range of a bandpass filter having transmission peaks at intervals, e.g., an FSR, corresponding to the target grid. The bandpass filter is used generate feedback signals that are used to lock the remaining frequencies to the grid. The athermal filter may be integrated on a silicon photonic integrated circuit.

25 Claims, 6 Drawing Sheets

(56) References Cited

U.S. PATENT DOCUMENTS

| | | | |
|---|---|---|---|
| 2003/0095737 A1* | 5/2003 | Welch | B82Y 20/00 385/14 |
| 2008/0025350 A1* | 1/2008 | Arbore | G02B 6/12011 372/20 |
| 2008/0031626 A1 | 2/2008 | Welch et al. | |
| 2011/0135301 A1* | 6/2011 | Myslinski | H04B 10/572 398/34 |
| 2013/0308951 A1 | 11/2013 | Blumenthal et al. | |

OTHER PUBLICATIONS

Park, K.J. et al., "Simple Monitoring Technique for WDM Networks", Electronics Letters, Mar. 4, 1999, vol. 35, No. 5, pp. 415-417.

Guha, Biswajeet, et al., "Minimizing Temperature Sensitivity of Silicon Mach-Zehnder Interferometers", Feb. 1, 2010/vol. 18, No. 3/ Optics Express, pp. 1879-1887.

Park, K.J. et al., "A Multi-Wavelength Locker for WDM System", 2000 OSA/OFC 2000, pp. WE4-1 to WE4-4.

* cited by examiner

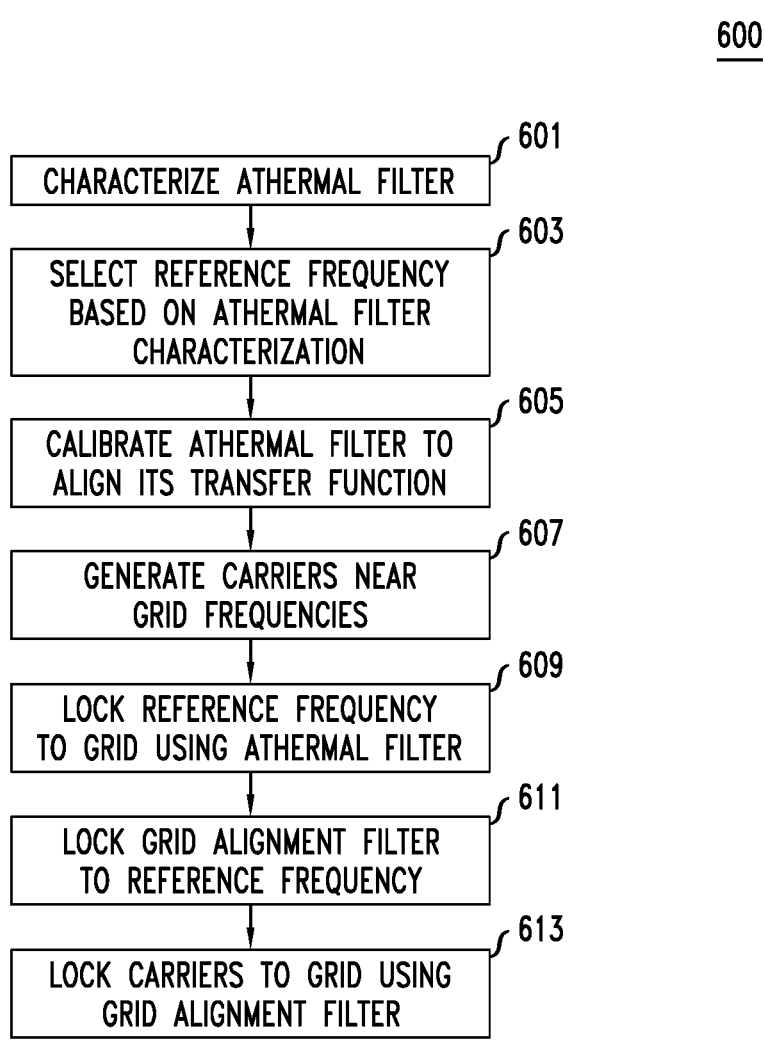

METHOD AND APPARATUS FOR LOCKING WDM TRANSMITTER CARRIERS TO A DEFINED GRID

TECHNICAL FIELD

This invention relates to a method and apparatus frequency locking in wavelength division multiplexing (WDM) and dense wavelength division multiplexing (DWDM) optical networks, and more particularly, to where the multiplexed light frequencies are locked to a defined or standardized spacing grid.

BACKGROUND OF THE INVENTION

In wavelength division multiplexing (WDM) and dense wavelength division multiplexing (DWDM) optical networks many optical signals at different frequencies, i.e., having different wavelengths, are multiplexed together for transmission over a single medium. Note that, as frequency and wavelength are inversely related, they are often used interchangeably to indicate the same thing by those skilled in the art. The same may be done herein. In order to avoid crosstalk between the signals at the various frequencies, i.e., interchannel crosstalk, it is important that the carrier for each signal be properly locked to its designated frequency. Typically the different frequencies employed in a system are defined by a prescribed frequency set which typically enumerates the frequency values to be used or the spacing between them. This set or spacing is often expressed as a grid. For example, the International Telecommunications Union (ITU) has defined several standardized grids, e.g. for DWDM networks, and these grids define optical channels having carrier separations of 100 GHz, 50 GHz, and even as small as 25 GHz. Such densely multiplexed optical carriers need to be well locked to their designated, i.e., desired or target, optical frequency.

Frequency locking to the ITU grid is usually achieved using a reference Fabry-Perot etalon in combination with complicated temperature measurement and adjustment circuits in order to keep the resonances of the etalon fixed to the ITU grid. The etalon is usually made of quartz glass because of its small thermo-optic and linear thermal expansion coefficients.

Large scale photonic integrated circuits (PIC) appear to have promise for realizing cost and energy efficient WDM and DWDM transmitters. However, the construction of absolute wavelength references on a chip is challenging because of the large thermo-optic coefficient of both III-V and Si materials, and thus doing so requires employing advanced temperature stabilization techniques, which is undesirable. Integration of the conventional quartz glass made Fabry-Perot etalon on a chip is also not attractive because of the relatively large dimensions of the etalon. Moreover, any interferometer or resonant filter fabricated on such a photonic chip, e.g., one made of silicon, will suffer from fabrication errors in that it has been found that most of the time the resulting actually fabricated filter shape is significantly different from the one anticipated in the design process.

Generally, prior art methods of on-chip wavelength locking can be classified into two groups.

In the first group of solutions, the temperature of the chip/cavity is measured and through use of a closed loop control circuit the bias voltage/current on the intra-cavity components is adjusted with the help of look-up tables. One disadvantage of such a solution is that the devices are biased with a large DC power to allow adjustment in both the negative and positive directions depending on whether the temperature of the chip increases or decreases.

In the second group of solutions, the temperature of the chip is kept constant with the help of temperature sensors and thermoelectrical coolers. This solution controls the whole transmitter chip and does not correct temperature gradients on the chip. It also suffers from relatively large delay times because of the large dimension of the chip.

Note that in both of the above groups of solutions the temperature change itself is used as information about the wavelength drift and that no absolute wavelength measurements are performed. Also, in the second group of solutions the wavelength is measured and locked to the grid by means of an external Fabry-Perot etalon. This solution, even though practical and reliable, is disadvantageous in that 1) it is not compact and cost effective, 2) it is sensitive to mechanical vibrations, and 3) it still requires active control of the temperature.

SUMMARY OF THE INVENTION

We have recognized that the locking of optical carriers to a frequency set, e.g., to a grid, for use in WDM and DWDM networks can be achieved, in accordance with the principles of the disclosure, by employing at least one athermal optical filter which exhibits athermal behavior in a desired, i.e., target, frequency range to achieve a multi-frequency optical transmitter where all such frequencies are locked to a prescribed grid, e.g., the ITU grid. The athermal optical filter may be integrated on a silicon photonic integrated circuit and be relatively immune to fabrication errors. Advantageously, the need for a Fabry Perot etalon either on or off of the photonic integrated circuit is eliminated.

In one illustrative embodiment of the invention, the frequency of a first channel is locked, i.e., caused to be maintained substantially exactly aligned, to a desired grid frequency, i.e., a target frequency, using an athermal filter, which itself is first calibrated relative to the grid which defines the desired, i.e., target, channel frequency set, e.g., the ITU grid. This first channel may be considered to be a reference channel. In some embodiments, a tunable free spectral range (FSR) bandpass filter having transmission peaks spaced at intervals that correspond with the frequencies of the desired grid, e.g., having a free spectral range of 100 GHz for a grid having a 100 GHz spacing, and which may be considered to be a grid alignment filter, has its transfer function tuned and locked based on the locked first channel. Thereafter the remaining frequencies are locked to the grid using the grid alignment filter, i.e., the tunable FSR bandpass filter.

In one embodiment of the invention, each channel may have impressed thereon a dither signal that is detectable. The dither signal may be detected by converting the optical signal to the electrical domain, e.g., using one or more photodiodes. The magnitude of the dither signal may be detected in a conventional manner, e.g., by direct measurement or using a fast Fourier transform (FFT). In embodiments of the invention in which a unique dither signal is impressed on each channel, the individual dither signals allow for the identification of each channel, e.g., using an FFT, which is useful when multiple ones of the channels are multiplexed together. The dither signal may be impressed by either varying the intensity of the carrier produced by the individual lasers or by individually varying each respective lasing frequency of the carrier produced by the individual lasers, e.g., the carrier frequency.

The tunable free spectral range (FSR) bandpass filter has its transfer function tuned and locked based on the frequency of the channel that was locked to the grid using the athermal filter, e.g., by tuning the FSR bandpass filter so as to maximize or minimize a signal related to the first channel, e.g., the magnitude of the channel itself or the magnitude of the dither signal for the first channel, that is detected at the output of the FSR bandpass filter. Once the tunable FSR bandpass filter has its transfer function locked to the channel that was locked to the grid using the athermal filter, the output of the remaining lasers are locked to the grid by tuning each laser so that a signal produced by the laser, e.g., the dither signal or the carrier signal itself, is maximized or minimized after passing through the tunable FSR bandpass filter, depending on how the FSR bandpass filter itself was locked.

In another illustrative embodiment of the invention, each channel is locked to its desired grid frequency using its own dedicated configurable athermal filter proposed by us in copending U.S. patent application Ser. No. 15/219,720 entitled Reconfigurable Athermal Optical Filters filed on Jul. 26, 2016 which is incorporated by reference as if fully set forth herein.

A transmitter configured in accordance with the principles of the disclosure has the advantages of: 1) being integrable on a chip and therefore compact, 2) being easy to calibrate, 3) being faster to lock than systems employing prior art methods because it does not rely on accurate temperature measurements and adjustment of the whole transmitter chip, which takes a relatively long time, and 4) does not require sensitive mechanical preparation, e.g., polishing, angle alignment, etc., as is required when using an etalon.

BRIEF DESCRIPTION OF THE DRAWING

In the drawing:

FIG. 6 shows a flow chart for an exemplary process indicating conceptually how to lock the frequencies of at least two carriers to a grid in accordance with the principles of the disclosure.

DETAILED DESCRIPTION

Figure 1:
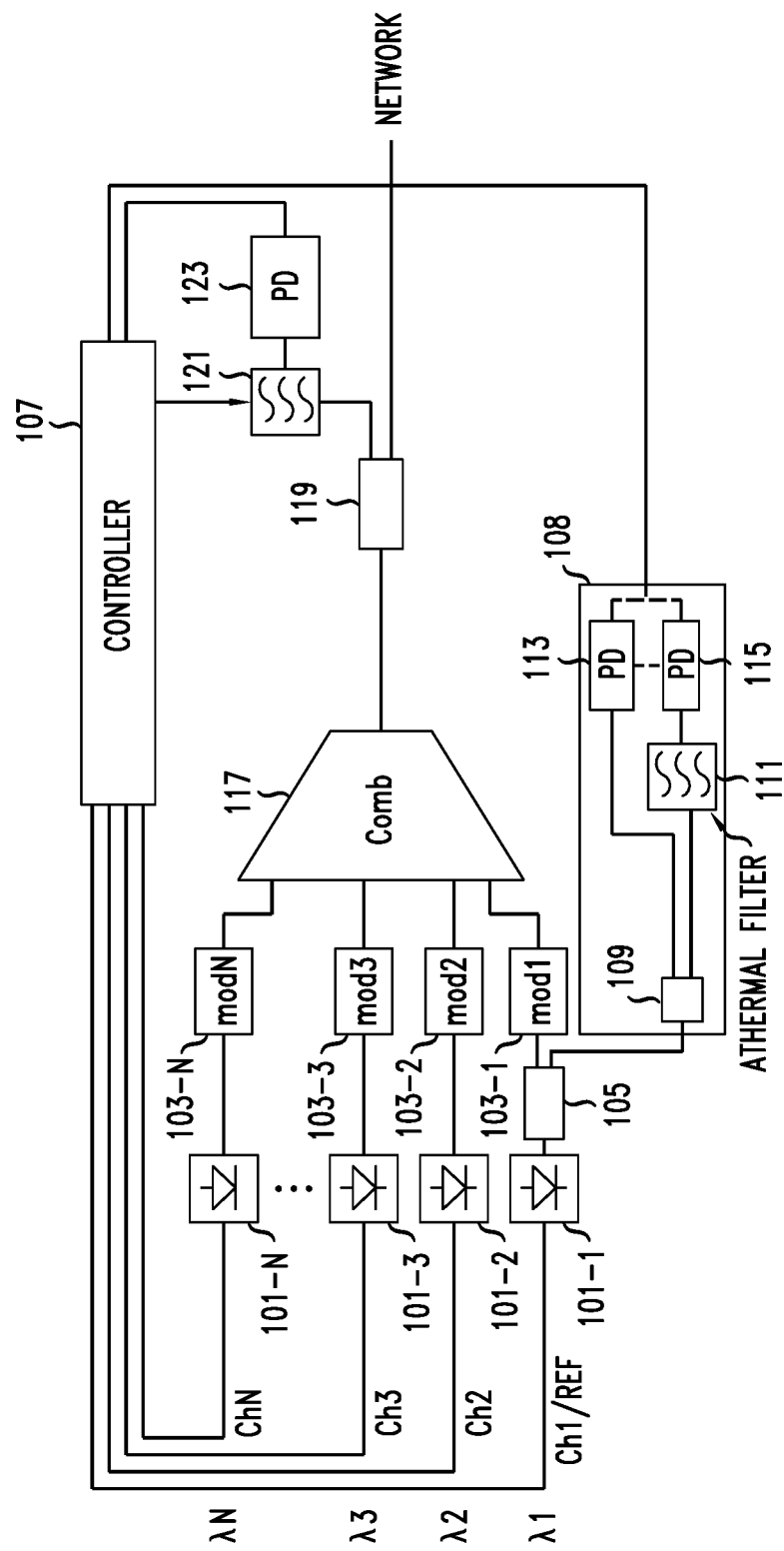
FIG. 1 shows an illustrative multiple wavelength optical transmitter arranged in accordance with the principles of the disclosure.

The following merely illustrates the principles of the disclosure. It will thus be appreciated that those skilled in the art will be able to devise various arrangements that, although not explicitly described or shown herein, embody the principles of the disclosure and are included within its spirit and scope. Furthermore, all examples and conditional language recited herein are principally intended expressly to be only for pedagogical purposes to aid the reader in understanding the principles of the disclosure and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future.

Thus, for example, it will be appreciated by those skilled in the art that any block diagrams herein represent conceptual views of illustrative circuitry or components embodying the principles of the disclosure. Similarly, it will be appreciated that any flow charts, flow diagrams, state transition diagrams, pseudocode, process descriptions and the like represent various processes which may be substantially represented in computer readable medium and so executed by a computer or processor, whether or not such computer or processor is explicitly shown.

The functions of the various elements shown in the FIGS., including any functional blocks labeled as "processors" or "controllers", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage.

Other hardware, conventional and/or custom, may also be included. Similarly, any switches shown in the FIGS. are conceptual only. Their function may be carried out through the operation of program logic, through dedicated logic, through the interaction of program control and dedicated logic, or even manually, the particular technique being selectable by the implementor as more specifically understood from the context.

In the claims hereof any element expressed as a means for performing a specified function is intended to encompass any way of performing that function. This may include, for example, a) a combination of electrical or mechanical elements which performs that function or b) software in any form, including, therefore, firmware, microcode or the like, combined with appropriate circuitry for executing that software to perform the function, as well as mechanical elements coupled to software controlled circuitry, if any. The inventions as defined by such claims reside in the fact that the functionalities provided by the various recited means are combined and brought together in the manner which the claims call for. Applicant thus regards any means which can provide those functionalities as equivalent as those shown herein.

Software modules, or simply modules which are implied to be software, may be represented herein as any combination of flowchart elements or other elements indicating performance of process steps and/or textual description. Such modules may be executed by hardware that is expressly or implicitly shown.

Unless otherwise explicitly specified herein, the drawings are not drawn to scale.

Also, unless otherwise specified here, all optical elements or systems that are capable of providing specific function within an overall embodiment disclosed herein are equivalent to one another for purposes of the present disclosure.

In the description, identically numbered components within different ones of the FIGS. refer to the same components.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "receiving", "selecting", "assigning", "estimating", "determining", or the like, refer to the action and processes of a computer system, or similar computing device, that manipulates and transforms data represented as physical (electronic) quantities within the computer system's registers and memories into other data similarly represented as physical quantities within the computer system memories or registers or other such information storage, transmission or display devices.

FIG. 1 shows illustrative multiple wavelength optical transmitter 100, e.g., a WDM or DWDM transmitter, arranged in accordance with the principles of the disclosure. Transmitter 100 is arranged to transmit up to N different frequencies corresponding to N different wavelengths, e.g., wavelengths λ1 through λN, over each of a respective channel, channel 1 (Ch1) through channel N (ChN). To this end, each channel has its carrier generated by a respective one of tunable lasers 101-1 through 101-N, collectively lasers 101. Laser 101-1 generates the carrier for Ch1, laser 101-2, generates the carrier for Ch2, and so forth through laser 101-N which generates the carrier for ChN. The frequency of each of lasers 101 may be individually tunable, e.g., in response to a control signal, e.g., from controller 107.

The laser light output from each of lasers 101 is coupled to a respective one of modulators 103, which includes modulators 103-1 through 103-N. For example, the light from laser 101-1 is coupled to modulator 103-1, the light from laser 101-2 is coupled to modulator 103-2, and so forth until laser 101-N has its laser light coupled to modulator 103-N.

Modulators 103 each modulate the received laser light with a respective data signal that is supplied to each of modulators 103 but is not shown in FIG. 1 for clarity. Such optical modulators are well known in the art.

Unlike lasers 101-2 through 101-N, prior to reaching modulator 103-1 the light from laser 101-1 passes through optical splitter 105. Optical splitter 105 divides the light from laser 101-1 into two portions. A first portion of the laser light output from optical splitter 105, typically most of the light, e.g., in a range of 90% to 99%, is supplied to modulator 103-1. This portion is primarily used ultimately for transmission over an optical network.

A second, remaining portion of the laser light from laser 101-1, e.g., complementary to the first range, e.g., 1% to 10%, that is output from optical splitter 105 is supplied to athermal-filter-based locking sensor 108. Locking sensor 108 may take various forms. In one illustrative arrangement shown in FIG. 1, light supplied from splitter 105 to locking sensor 108 goes to optical splitter 109. Note that the particular value of such optical-splitter-based taps for signal measurement purposes may depend on the sensitivity of the sensors used, e.g., photodiodes 113 and 115, and any other losses in the path prior to the sensors, e.g., the insertion loss of athermal filter 111 in this case. A first portion of the laser light from laser 101-1, e.g., approximately half thereof, that is output from optical splitter 109 may be supplied to athermal optical filter 111, in accordance with an aspect of the invention. A second portion of the laser light from laser 101-1, e.g., approximately half thereof, that is output from optical splitter 109 may be supplied to photodiode 113. After passing through athermal optical filter 111, the now filtered first portion of the laser light from laser 101-1 that is output from optical splitter 109 is supplied to photodiode 115.

Athermal optical filter 111 is a bandpass filter which may have a number of passbands having a periodicity for the bands that are passed, i.e., a free spectral range (FSR) and may be based on an athermal Mach-Zehnder interferometer. As such, athermal optical filter 111 is suitable to be manufactured on a silicon photonic integrated circuit, exhibits athermal behavior in a useable frequency range, and is relatively immune to the fabrication errors. More specifically, athermal Mach-Zehnder interferometer based optical filters have been proposed for silicon photonics technology, e.g., in U.S. patent application Ser. No. 12/916,663, B. Guha et al., Optics Express 18(4), 3487-3493 (2010), and B. Guha et al., Optics Express, 18(3), 1879-1887(2010), all of which are incorporated by reference as if entirely set forth herein. Such athermal filters are typically based on the fact that essentially perfect athermal operation is possible for a particular wavelength in a Mach-Zehnder interferometer that has two arms with different waveguide widths in various sections thereof.

Figure 2:
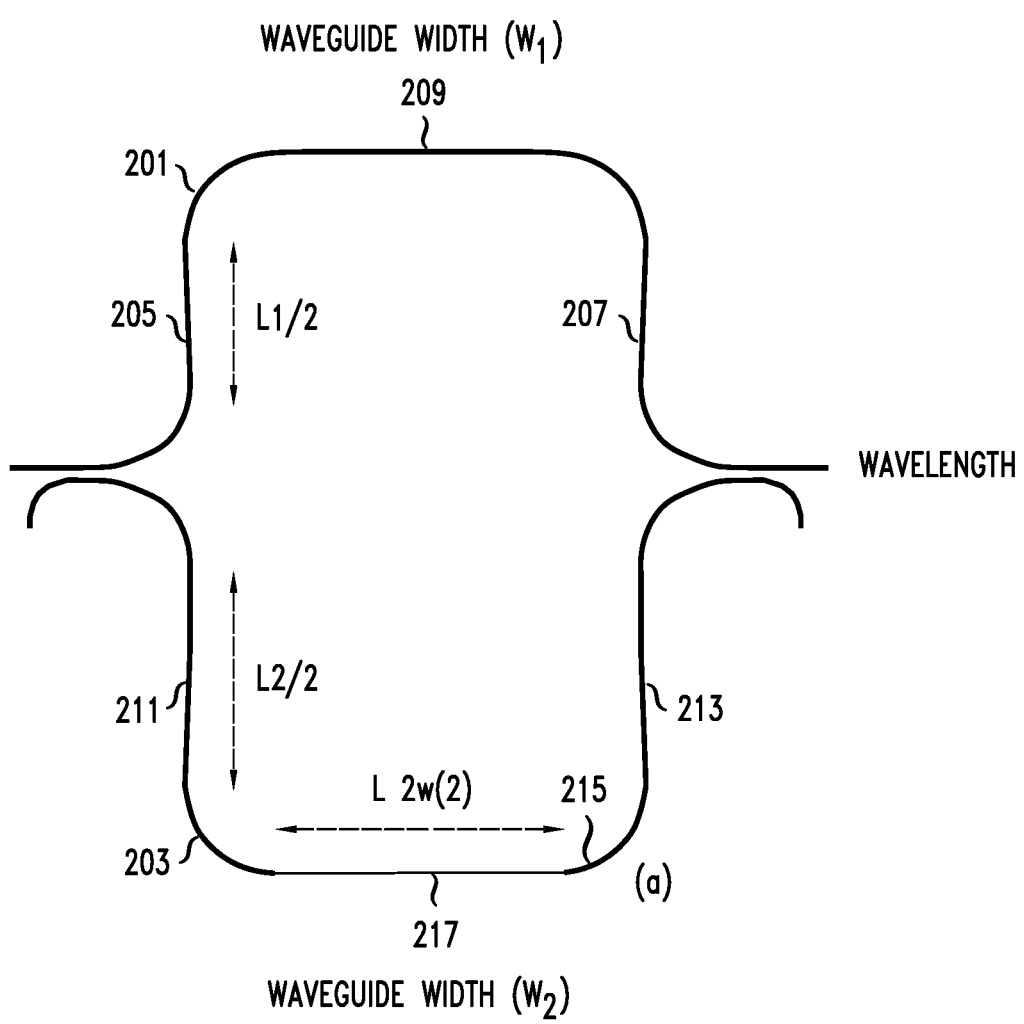
FIG. 2 shows an illustrative athermal Mach-Zehnder interferometer.

More specifically, FIG. 2 shows illustrative athermal Mach-Zehnder interferometer 200, based on the disclosure in Optics Express, 18(3), 1879-1887(2010) by B. Guha et al., also referred to as Minimizing Temperature Sensitivity of Silicon Mach-Zehnder Interferometers, Optics Express, Vol. 18, No. 3, 1 February 2010, pp. 1879-1887, which may be used as athermal optical filter 111 (FIG. 1). Mach-Zehnder interferometer 200 may be made up of arms 201 and 203, which are generally not the same. Note that although described below in terms of upper, lower, horizontal, and vertical, these directions are for pedagogical purposes and such directions are for convenience of explanation and are with reference to normal reading view of the page.

More specifically, as shown in FIG. 2, arm 201 has two vertical, portions 205 and 207. Each of vertical portions 205 and 207 has a length $L_1/2$. Also, arm 201 includes horizontal portion 209 with a length L, in the manner shown in FIG. 2. Each of vertical portions 205 and 207 and horizontal portion 209 has a width $W_1$. Similarly, arm 203 has two vertical, portions 211 and 213, in the manner shown in FIG. 2. Each of vertical portions 211 and 213 has a length $L_2/2$. Also, arm 203 includes horizontal portion 215, in the manner shown in FIG. 2. Each of vertical portions 211 and 213 has a width $W_1$. However, at least a portion of horizontal arm 215 has a portion 217 with a width $W_2$ that is less than that of width $W_1$. How to select particular values for L, $L_1$, $L_2$, $W_1$ and $W_2$ is well known in the art, e.g., as explained in Optics Express, 18(3), 1879-1887.

Light is typically input to athermal filter 111 in the area where arms 201 and 203 meet. When athermal filter 111 has a symmetric design, e.g., as shown in FIG. 2, light may be input from either side with the output taken at the other side. For convenience and to match FIGS. 1, 4, and 5, it may be assumed that the input is from the left side and the output is on the right side.

As is well known, such Mach-Zehnder interferometers may have two inputs and two outputs. Given that embodiments of the invention typically only require one input and one output, the other input and output may be employed to supply signals used to calibrate athermal optical filter 111. This may be done using ports connected to Mach-Zehnder interferometer 200 which allow access thereto but which are not shown in FIG. 1 for clarity purposes.

Also, Mach-Zehnder interferometer 200 may incorporate one or more controllable phase shifters, which may be any type of phase shifter, e.g., thermo-optic, electro-optic, opto-mechanical, magneto-optic, and so forth. Such a phase shifter may be built into one or both of the arms 201 and 203 of Mach-Zehnder interferometer 200. However, for clarity of exposition, such controllable phase shifters are not shown in FIG. 2, as they are well known in the art.

Note that such athermal filters are considered to be athermal with respect to a prescribed temperature operating range for a specific frequency range and essentially only one specific frequency point is actually perfectly athermal. More specifically, a filter is considered to be athermal at a particular frequency when the change of transmission of light at the particular frequency through the filter changes less than a prescribed, relatively small, amount. If the change is essentially zero, then the filter is considered to be perfectly athermal for that frequency. Typically with current designs only one frequency is actually "perfectly" athermal. However, a frequency with a change sufficiently close to zero, or at least less than the prescribed amount, may be effectively called perfectly athermal, thus leading to a range of operating frequencies for the filter that are termed perfectly athermal. For example, if the frequency change for a frequency is less than 0.5 GHz, that frequency may be considered perfectly athermal.

Figure 3:
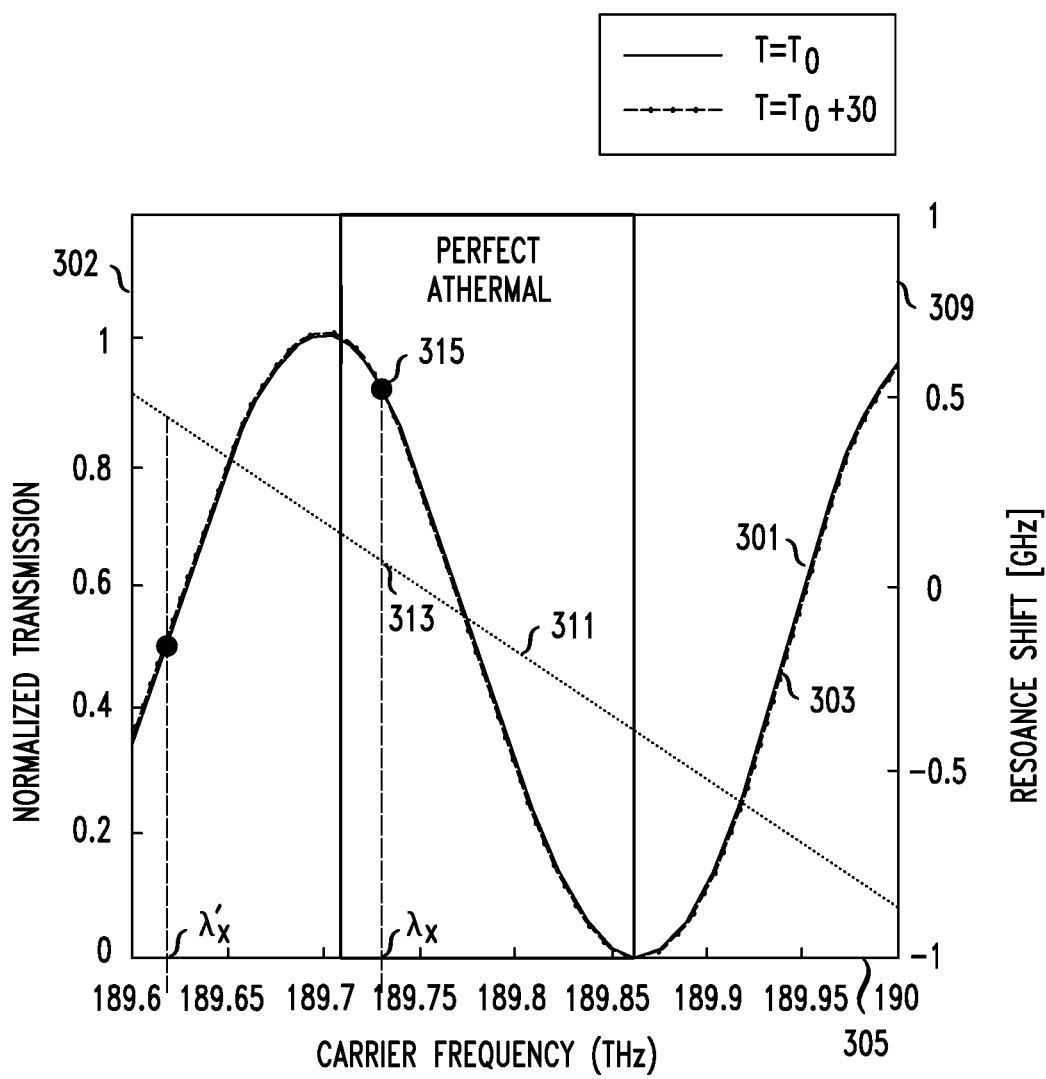
FIG. 3 shows an illustrative transmission spectrum of an athermal filter.

For pedagogical purposes only, shown in FIG. 3 is an illustrative transmission spectrum for 400 GHz of an athermal filter having a free spectral range of about 325 GHz. More specifically, shown are two substantially, but not quite, overlapping sinusoids. First sinusoid 301, represents the transmission spectrum for a temperature T at a value of $T_0$ and second sinusoid 303 represents the transmission spectrum for a temperature T at a value of $T_0+30°$ C. Thus, the prescribed temperature operating range is from $T_0$ to $T_0+30°$ C.

X-axis 305, along the bottom of FIG. 3, represents the carrier frequency in terahertz (THz) at which the transmission characteristics through the athermal filter discussed hereinbelow are determined. Such characteristics may be calculated in view of the waveguide geometry and filter design principles, although in the alternative measurements may be made. Y-axis 307 along the left side of FIG. 3 is the magnitude of the normalized transmission function of each frequency of light through the athermal filter, e.g., the output power divided by the input power, where 1 means that all of the light passes through and 0 means that none of the light passes through. Y-axis 309 along the right side of FIG. 3 is the resonance shift in GHz.

The resonance shift is the difference between a first frequency having a particular output power $P_{out}$ for a given input power at a first temperature, e.g., the lowest permitted operating temperature, e.g., $T_0$, and a second frequency having the same output power $P_{out}$ for the same given input power but where the temperature is increased to the maximum permitted operating temperature, e.g., $T_0+30°$ C. For example, if the light output is 0 at a particular frequency at $T_0$, the resonance shift is the difference in frequency between that particular frequency and whatever frequency the light output is 0 when the temperature is $T_0+30°$ C.

Line 311 represents the resonance shift for each input frequency, i.e., the difference in frequency needed to result in the same transmission between the light output at $T_0+30°$ C. as compared to the light output at $T_0$. At point 313 line 311 has a resonance shift value of 0, thus indicating that curves 301 and 303 perfectly overlap, e.g., at point 315. In other words, for the frequency $\lambda_x$ corresponding to point 313 the filter is operating perfectly athermally for a temperature shift of 30° C.

Note that even if a frequency of the desired grid is not within the perfectly athermal region, it is generally still possible to use the filter because the margin of error in the frequencies outside of the perfectly athermal region but relatively close thereto is typically smaller than the error permitted in the match of frequencies to the grid. Thus, for example, it is possible to use frequency $\lambda_x'$, which corresponds to the grid, even though it is somewhat outside of, but yet is the grid frequency closest to, the perfect athermal region. For example, if $\lambda_x'$ is outside the perfect athermal range, e.g., by 100 GHz, one can still lock the frequencies of the grid with a wavelength drift with temperature of less than 4 pm per 30° C., which is below the maximum allowed wavelength drift set by the International Telecommunications Union (ITU). Thus, even in the face of heating, and hence drift of $\lambda_x'$, the carriers will still be locked with sufficient precision to meet the ITU requirement.

Unfortunately, at present one cannot predict accurately at the filter design stage where the athermal frequency range of operation of the filter will result, due to manufacturing challenges. Fortunately, filters may be designed such that the resulting athermal band of the filter, wherever it is located, is larger than the channel spacing of the grid. Consequently, it is possible to find one frequency of optical transmitter 100 of FIG. 1 that is within the athermal band of the athermal filter and use that frequency as the first channel on which the locking of the other channels is based, in accordance with an aspect of the invention. In other words, an implementer can choose a frequency of the grid that is within, or sufficiently close to, the perfect athermal range to be the frequency to be produced by laser 101-1. Advantageously, this allows one to overcome a difficulty with the current fabrication of an athermal filter.

To achieve this, after fabrication and prior to operation of optical transmitter 100, the athermal filter is characterized, e.g., as shown in FIG. 3, to determine its temperature characteristics, e.g., to determine its perfect athermal operating range and the useable range near thereto, and then a frequency of the grid within that band is selected to be the frequency produced by laser 101-1.

Returning to the description of FIG. 1, controller 107 continuously locks the wavelength of the laser corresponding to the selected grid frequency for use with athermal filter 111, e.g., laser 101-1, to the athermal filter 111 by processing the error signal supplied from locking sensor 108. The error signal describes the wavelength drift of the laser 101-1 and is used by controller 101 to generate a control signal which keeps laser 101-1 at the prescribed frequency.

The modulated optical signals supplied as output by each of modulators 103 are coupled to combiner 117 which multiplexes them together. A multiplexed optical signal which is a combination of all of the optical signals supplied as outputs by modulators 103 is supplied as an output from combiner 117. This combined optical signal is supplied to optical splitter 119. A small portion of the light received by optical splitter 119, e.g., in a range of 1% to 10%, the particular value of which may depend on the sensitivity of photodiode 123, is supplied as an output from optical splitter 119 to optical filter 121. This is essentially a tap for measurement purposes. The remaining portion e.g., in a range of 90 to 99%, is supplied as an output to the optical network (not shown).

Optical filter 121 may be considered to be a grid alignment filter, in accordance with an aspect of the invention. Optical filter 121 is a tunable bandpass filter with a number of passbands having a periodicity for the bands that are passed, the periodicity being the free spectral range (FSR) of the filter, which should be selected based on the grid spacing to which the optical carriers are to be locked. More specifically, the spacing between the transmission peaks, e.g., the free spectral range, of optical filter 121 should correspond to the spacing of the grid. In one embodiment of the invention, the spacing is the same as the spacing of the grid. In another embodiment of the invention, the grid spacing may be an integral multiple of the spacing between the peaks in transmission of optical filter 121, i.e., the grid spacing may be a multiple of the FSR of optical filter 121. Another way to look at this is that the FSR of optical filter 121 may be designed to be a whole integer fraction of the grid channel spacing. So for example, if a 100 GHz grid is desired, i.e., is the target grid, one may employ a FSR filter with a 25 GHz FSR and just use every fourth transmission peak.

Optical filter 121 is tunable in that the location of a particular transmission peak, e.g., the lowest peak, may be tuned to a particular frequency and then all of the other peaks are offset from there based on the filter's free spectral range. For example, the free spectral range of optical filter may be selected to be 100 GHz corresponding to the 100 GHz ITU-grid filter. As such, optical filter 121 will have transmission peaks spaced 100 GHz apart. The filtered output of optical filter 121 is supplied to photodiode 123, which converts the filtered optical signal into a corresponding electrical signal that is supplied as an input to controller 107.

In operation, the carrier frequency of laser 101-1, which may be referred to as the reference frequency, is first locked to its desired frequency using athermal filter 111 in one of the ways described hereinbelow. As a consequence of doing so, laser 101-1 is generating a signal locked in alignment with the grid, i.e., locked at the desired ITU grid frequency for λ1.

Furthermore, in the well known manner, a low bit rate dither signal is introduced onto each optical carrier. The dither signal may be introduced in the amplitude of the laser, e.g., by changing the optical power a little in a controlled manner either inside the lasers 101 or by modulators 103, or the dither signal may be a change in the frequency of the laser, e.g., by causing the frequency to change a little in a controlled manner. Controller 107 issues control signals that cause the dither signals to be impressed, i.e., introduced, by lasers 101 onto the various carriers. If the dither signals are introduced via modulators 103 rather than by lasers 101, control signals (not shown) are supplied from controller 107 to modulators 103. The dither signals must be of such character so that controller 107 can detect them as described hereinbelow.

Each optical carrier has its own unique dither signal introduced thereto, thus enabling each optical carrier to be uniquely identified. For example, laser 101-1 could have a 2 KHz dither signal, laser 101-2 could have a 4 KHz, laser 101-3 could have a 6 KHz, and so forth. In a different arrangement, laser 101-1 could have a 1 KHz dither signal, laser 101-2 could have a 2 KHz, laser 101-3 could have a 3 KHz, and so forth. In yet a further arrangement, laser 101-1 could have a 101 KHz dither signal, laser 101-2 could have a 102 KHz, laser 101-3 could have a 103 KHz, and so forth. Various other dither frequencies and patterns therefore can be selected at the discretion of the implementor. The dither signals are used to lock the other optical carriers to the desired grid using optical filter 121, as described hereinbelow.

Controller 107 receives the output of photodiode 123, which is an electrical representation of the output of optical filter 121, and performs an analog to digital conversion thereon. The resulting signal is a digital time domain representation of the output of optical filter 121. Controller 107 then performs a fast Fourier transform (FFT) on a time window of the digital time domain representation to produce a frequency domain representation thereof. The frequency representation reveals the dither signals which are the magnitude of the FFT signal at the frequencies of the dither signals when the dither signals are amplitude modulated on the carriers.

To lock all the optical frequencies other than frequency of channel 1, which was locked to the grid using athermal filter 111, the following may be performed, in accordance with an aspect of the invention. First, a transmission point of optical filter 121 is locked to the locked frequency of channel 1, i.e., the frequency of the grid being output by laser 101-1. This may be achieved by tuning a transmission point of optical filter 121 so as to be aligned with the locked frequency of channel 1. Once this is achieved, the corresponding transmission points of optical filter 121 are all automatically set relative to the locked frequency, because, by design of optical filter 121, they are all at fixed distances from the locked frequency in multiples of the free spectral range of optical filter 121. In other words, in order to lock optical filter 121 to the locked frequency of channel 1, a control signal supplied from controller 107 to optical filter 121 is used to adjust the location of the corresponding transmission points of optical filter 121. More specifically, controller 121 adjusts the control signal used to tune the peaks upwards or downwards in the frequency band so as to move the peaks in response to the detected magnitude of the dither signal of channel 1 that is revealed by the FFT.

In general, tuning is performed by adjusting a tuning signal in one direction or the other until a specified target magnitude $A_{dither}$ of the dither signal is detected. The target dither signal magnitude $A_{dither}$ for a particular channel is chosen based on the dither signal type and on the particular channel. Typically the specified target is a maximum or a minimum and is based on the type of dither signal employed, if any, and the nature of the selected transmission point.

For example, with regards to tuning optical filter 121, the tuning signal for optical filter 121 may be adjusted in one direction or the other until a specified target magnitude $A_{dither}$ of the dither signal for channel 1 is detected, at which point optical filter 121 is locked. Locking of optical filter 121 may be achieved by holding steady the control signal supplied thereto by controller 107 at the value that achieved the maximum dither reading for channel 1.

For example, in one embodiment of the invention, when the laser 101-1 has its amplitude modulated with a low frequency dither signal and the selected transmission point is a transmission maximum, the laser frequency may be tuned so as to maximize the measured magnitude of the amplitude of the dither signal. This indicates that the maximum dither signal is passing through optical filter 121, hence optical filter 121 has a transmission peak that corresponds to the frequency of laser 101-1. In another embodiment of the invention, when the laser 101-1 has its amplitude modulated with a low frequency dither signal and the selected transmission point is a transmission minimum, the laser frequency may be tuned so as to minimize the measured magnitude of the amplitude of the dither signal. This indicates that the minimum dither signal is passing through optical filter 121, hence optical filter 121 has a transmission minimum that corresponds to the frequency of laser 101-1.

In yet another embodiment of the invention, when laser 101-1 has its frequency modulated with a low frequency dither signal and the selected transmission point is either a transmission maximum or a transmission minimum, the laser frequency is tuned so as to minimize the measured magnitude of the dither signal. As a result of the minimization, a minimum or maximum of optical filter 121 matches the frequency of laser 101-1. In this regard, note that the minimum and the maximum can be distinguished based on the total average power impinging on the photodiode. In yet a further embodiment of the invention, when the laser 101-1 has its frequency modulated with a low frequency dither signal and the selected transmission point is the point of maximum slope of the filter transfer function, the laser frequency is tuned so as to maximize the measured magnitude of the dither. As a result of the point of maximum slope of the transfer function of optical filter 121 matches the frequency of laser 101.

In accordance with an aspect of the invention, once optical filter 121 is locked, the frequency of each remaining channel, e.g., each of channels 2 through N, is tuned, which may be sequentially, although more than one channel may be tuned effectively simultaneously depending on the processing capabilities of controller 107, so as to achieve specified value of the amplitude of the dither signal detected by controller 107 for that channel.

For example, in one embodiment of the invention, when the dither signal is impressed on the magnitude of laser 101-1 and optical filter 121 was locked to a maximum of the dither, the dither amplitude modulated signal of the remaining lasers 101 may be maximized. Doing so causes the frequency of each of the remaining lasers 101 to align with the one of transmission maxima of optical filter 121, which are aligned with the grid positions, and hence with its corresponding position on the desired frequency grid. In another embodiment of the invention, when the dither signal is impressed on the magnitude of laser 101-1 and optical filter 121 was locked to a minimum of the dither, the amplitude modulated dither signal of the remaining lasers 101 may be minimized. Doing so causes the frequency of each of the remaining lasers 101 to align with the one of transmission minima of optical filter 121, which are aligned with the grid positions, and hence with its corresponding position on the desired frequency grid. In yet a further embodiment of the invention, when the dither signal is impressed on the frequency of laser 101-1 and optical filter 121 was locked to a maximum of the dither, the frequency dither signal of the remaining lasers 101 may be maximized. Doing so causes the frequency of each of the remaining lasers 101 to align with one of the maximum slope points of optical filter 121, which are aligned with the grid positions, and hence with its corresponding position on the desired frequency grid.

Note too that, as mentioned above, the mechanism of locking used for each laser, e.g., using the maximum of the dither signal or the minimum, can be different. One laser may be locked based on the minimum, one based on the maximum, and so forth. This is useful when variable spacing between the channels is desirable, e.g., an irregular grid.

Turning now to the locking to the grid of the first one of the carriers using athermal filter 111, e.g., the carrier generated by laser 101-1, in the embodiment of the invention shown in FIG. 1, an error signal is calculated by controller 107 based on the photocurrents generated by at least one of photodiodes 113 and 115 in athermal-filter-based locking sensor 108 and the error signal is used to control and lock laser 101-1 to the desired grid frequency.

As explained further hereinbelow, photodiodes 113 and 115 may be arranged as a balanced detector that feeds a single signal to controller 107, e.g., as indicated by the dashed line between them and leading out of locking sensor 108, as independent detectors that each supply a signal to controller 107, or only photodiode 115 may be employed and it supplies a single signal to controller 107. When only photodiode 115 is employed optical splitter 109 may be eliminated and the light from optical splitter 105 supplied directly to athermal filter 111.

In many embodiments of the invention, regardless of how athermal-filter-based locking sensor 108 is arranged, it is first necessary to calibrate athermal filter 111 so as to set its transfer function so that a particular point of the transfer function at which the error signal will be measured coincides with the selected grid frequency. This may be done by inserting a known laser signal a various frequencies, e.g., supplied by an external instrument, and observing the filter output.

Also, a table relating the filter transmission with respect to the phase shifter settings may be developed, e.g., in controller 107 or another location, even external to optical transmitter 100. For example, such a table may be developed by supplying an optical signal, e.g., from an external instrument, that is known to be at the desired grid frequency, to an optical input port (not shown) of optical transmitter 100, e.g., which is coupled to the port of Mach-Zehnder interferometer that is not used for optical transmitter 100, as mentioned hereinabove. At least one of the phase shifters is adjusted to cycle its possible values so as to change the filter transmission characteristics. The resulting output is measured and plotted against the phase shifter settings. The output may be measured, for example, at the output of photodiode 115. Alternatively, the output may be measured by an external instrument coupled to an output port (not shown) of optical transmitter 100, e.g., which is coupled to the port of Mach-Zehnder interferometer that is not used for optical transmitter 100, as mentioned hereinabove. Doing so enables identification of a transfer function of athermal filter 111 with respect to the phase shifter settings for the desired grid frequency and of particular interest in various embodiments are the settings of the phase shifters that achieve the typically employed locking points of 1) minimum transmission, 2) maximum transmission, and 3) maximum slope for the desired grid frequency.

In an alternative embodiment, laser 101-1 may be employed as the laser source for the calibration. It can be cycled through various frequencies, the particular values of which are definitively determined by an externally connected instrument that can precisely determine the frequency of laser light it receives, and a transfer function for athermal filter 111 develop based on the filter output, e.g., as measured by the output of photodiode 115 or the external instrument. Also, athermal filter 111 can be tuned to the desired grid wavelength and its phase shifter set by passing the signal from laser 101-1 to an output of optical transmitter 100 which is supplied to an external instrument that can precisely determine the frequency of laser light it receives and when it does not detect the desired frequency it can provide feedback to drive laser 101-1 to the desired grid frequency.

Once the settings for the desired locking point to be used is known, e.g., one of the minimum transmission, maximum transmission, and maximum slope is known, it is possible to lock laser 101-1 to the desired grid frequency without any assistance from an external instrument.

One simple way to lock laser 101-1 to the desired grid length when there is no dither signal impressed on the frequency of laser 101-1 or there may be a dither impressed on the intensity of the carrier signal, is to compare the power input to athermal filter 111, i.e., the power received at photodiode 113, measured as static photocurrent output by photodiode 113, with the power after filtering by athermal filter 111, i.e., the power received at photodiode 115, measured as static photocurrent output by photodiode 115, and determine where on the transfer function the laser frequency presently is. The frequency of laser 101-1 can then be controlled in view of the error signal to move up or down the transfer function until laser 101-1 is detected to have reached the desired lock point.

For example, in one embodiment, controller 107 sets the phase shifters so that athermal filter 111 has its point of maximum transmission at the desired grid frequency, the frequency of laser 101-1 is adjusted by controller 107 until the difference between the power before athermal filter 111 and the power after athermal filter 111 is minimized. This indicates that the power being allowed to pass through the filter is maximized, leading to the conclusion that the frequency of laser 101-1 has reached the desired grid frequency which is set at the maximum transmission point. In another embodiment, controller 107 sets the phase shifters so that athermal filter 111 has its point of minimum transmission at the desired grid frequency, the frequency of laser 101-1 is adjusted by controller 107 until the difference between the power before athermal filter 111 and the power after athermal filter 111 is maximized. This indicates that the power being allowed to pass through the filter is minimized, i.e., the filter is blocking as much power as it can, leading to the conclusion that the frequency of laser 101-1 has reached the desired grid frequency which is set at the minimum transmission point, i.e., maximum blocking point.

These measurements may be achieved by arranging photodiodes 113 and 115 as a balanced detector and having the output of the balanced detector supplied to controller 107 or by simply having them provide their output photocurrent individually to controller 107. In the latter case the ratio of the photocurrents could be compared and maximized or minimized rather than the difference. In yet a further embodiment, only the output from photodiode 115 need be considered and controller 107 simply adjusts the frequency of laser 101-1 until it detects a maximum value when it set the phase adjusters so that the desired grid frequency is at the maximum transmission point of athermal filter 111 or a minimum value when it set the phase adjusters so that the desired grid frequency is at the maximum transmission point of athermal filter 111.

In an embodiment of the invention in which a dither signal is impressed onto the frequency of the carrier generated by laser 101-1, when using a balanced detector, the amplitude of the dither signal should be minimized when controller 107 sets the phase shifters of athermal filter 111 so that the desired grid frequency coincides with either the minimum transmission point or the maximum transmission point of athermal filter 111. Alternatively, when using a balanced detector, the amplitude of dither signal should be maximized when controller 107 sets the phase shifters of athermal filter 111 so that the desired grid frequency coincides with the point of maximum slope for the transfer function.

Similarly, in an embodiment of the invention in which a dither signal is impressed onto the frequency of the carrier generated by laser 101-1, when using photodiodes 113 and 115 separately and performing the necessary computations in controller 107, the dither signal extinction ratio (PD 113/PD 115) should be minimized when controller 107 sets the phase shifters of athermal filter 111 so that the desired grid frequency coincides with either the minimum transmission point or the maximum transmission point. Alternatively, when using photodiodes 113 and 115 separately and performing the necessary computations in controller 107, the dither signal extinction ratio (PD 113/PD 115) should be maximized when controller 107 sets the phase shifters of athermal filter 111 so that the desired grid frequency coincides with point of maximum slope for the transfer function. Moreover, in this case it may be possible to lock laser 101-1 to any arbitrary extinction ratio (PD 113/PD 115) when controller 107 sets the phase shifters of athermal filter 111 so that the desired grid frequency coincides with that particular extinction ratio point.

In yet further embodiments of the invention in which a dither signal is impressed onto the frequency of the carrier generated by laser 101-1, when using only photodiode 115 and performing the necessary computations in controller 107, the dither signal amplitude should be minimized when controller 107 sets the phase shifters of athermal filter 111 so that the desired grid frequency coincides with either the minimum transmission point or the maximum transmission point. Alternatively, when using only photodiode 115 and performing the necessary computations in controller 107, the dither signal amplitude should be maximized when controller 107 sets the phase shifters of athermal filter 111 so that the desired grid frequency coincides with point of maximum slope for the transfer function.

There may also be embodiments in which the error signal is calculated by comparing the photocurrents measured at photodiodes 113 and 115 with a preset value for each of the respective photodiodes.

In yet a further embodiment of the invention, a dither signal may be impressed onto a control signal of athermal filter 111, e.g., a control signal applied to the phase shifters, thus varying its transmission characteristics. Doing so could, in particular, for example, dither the various minimum and maximum transmission points as well as the point of maximum slope. Such may be treated effectively as if there was a dither signal impressed on the frequency of the carrier produced by laser 101-1. Dithering the filter has the advantage of not requiring a change to the laser frequency.

As indicated hereinabove, controller 107 derives information about the wavelength drift of laser 101-1 from the calculated error signal and uses it to further regulate the frequency of laser 101-1 until it is locked to the desired grid e.g., the ITU, point so that laser 101-1 is now generating a signal in alignment with the grid, e.g., locked at the desired ITU grid frequency for $\lambda 1$.

Once the calibration process for laser 101-1 is complete, the above described process employing optical filter 121 may be used to bring the frequency of each of lasers 101-2 through 102-N into alignment with the grid.

As indicated hereinabove, embodiments of the invention where the FSR of optical filter 121 is a whole integer fraction of the grid channel spacing may be employed. Such embodiments are advantageous because they can increase the sensitivity to the dither signals by photodiode 123 for the input wavelength. This is because such filters have narrower peaks at their point of maximum transmission and narrower valleys at their point of minimum transmission as well as a greater slope in between.

Figure 4:
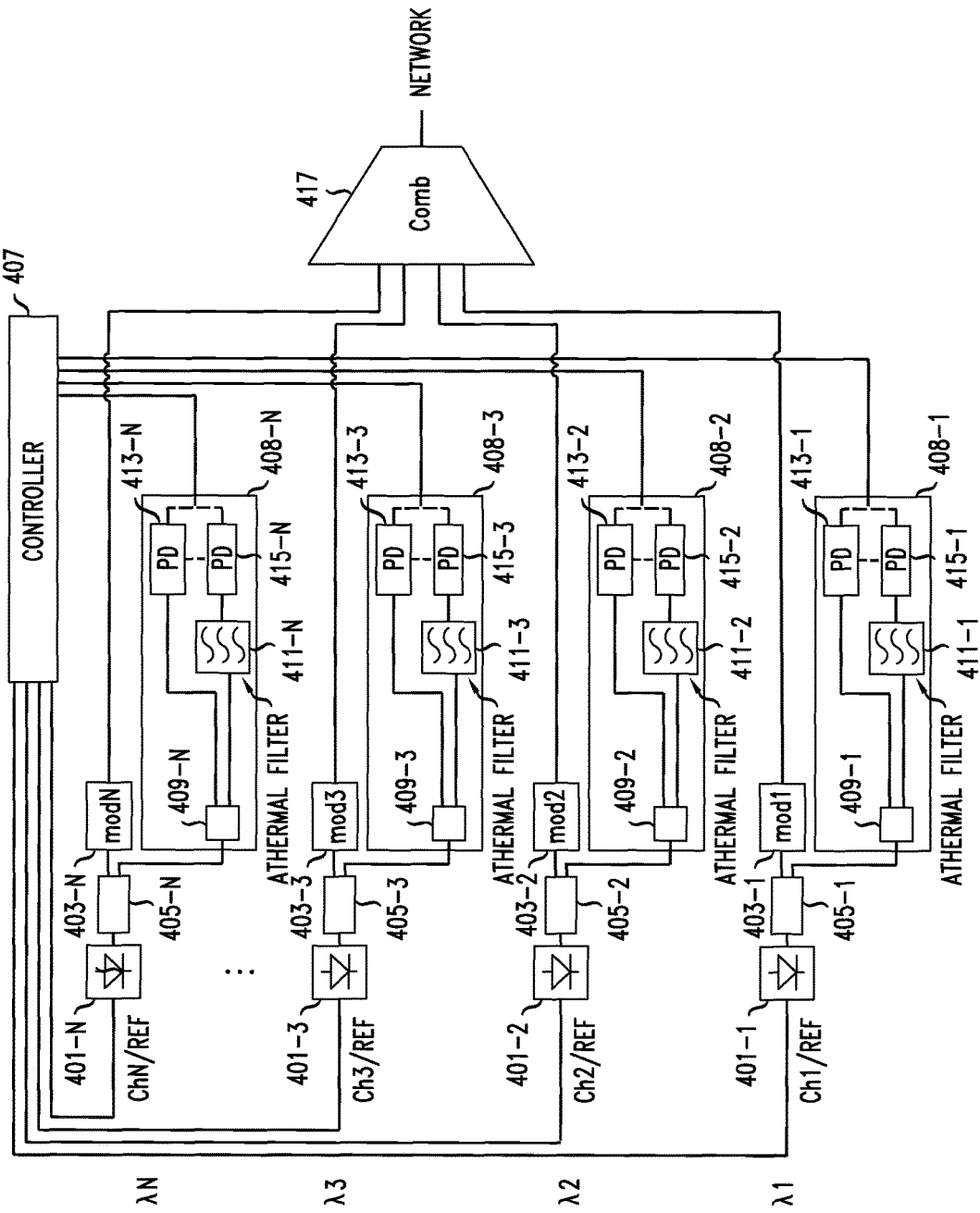
FIG. 4 shows another optical transmitter arranged in accordance with the principles of the disclosure.

FIG. 4 shows illustrative multiple frequency optical transmitter 400, e.g., a WDM or DWDM transmitter, arranged in accordance with the principles of the disclosure. Transmitter 400 is arranged to transmit up to N different wavelengths, e.g., wavelengths $\lambda 1$ through $\lambda N$, over each of a respective channel, channel 1 (Ch1) through channel N (ChN). To this end, each channel has its carrier generated by a respective one of tunable lasers 401-1 through 401-N, collectively lasers 401. Laser 401-1 generates the carrier for Ch1, laser 401-2, generates the carrier for Ch2, and so forth through laser 401-N which generates the carrier for ChN. The frequency of each of lasers 401 may be individually tunable, e.g., in response to a control signal, e.g., from controller 407.

The laser light output from each of lasers 401 is coupled to a respective one of splitters 405-1 through 405-N, collectively splitters 405. Each of splitters 405 divides the light from laser 401-1 into two portions. A first portion of the laser light output from each of optical splitters 405, typically most of the light, e.g., in a range of 90% to 99%, is supplied to a respective one of modulators 403, which includes modulators 403-1 through 403-N. This portion is primarily used ultimately for transmission over an optical network. For example, the light from laser 401-1 is coupled via splitter 405-1 to modulator 403-1, the light from laser 401-2 is coupled via splitter 405-2 to modulator 403-2, and so forth until laser 401-N has its laser light coupled via splitter 405-N to modulator 403-N.

Modulators 403 each modulate the received laser light with a respective data signal that is supplied to each of modulators 403 but is not shown in FIG. 4 for clarity. Such optical modulators are well known in the art.

The modulated optical signals supplied as output by each of modulators 403 are coupled to combiner 417 which multiplexes them together. A multiplexed optical signal which is a combination of all of the optical signals supplied as outputs by modulators 403 is supplied as an output from combiner 417. This combined optical signal is supplied to as an output to the optical network (not shown).

A second, remaining portion of the laser light from each of lasers 401, e.g., complementary to the first range, e.g., 1% to 10%, the particular value of which may depend on the sensitivity of the respective pairs of photodiodes 413 and 415 and the optical loss in the athermal filters, that is output from optical splitters 405 is supplied to a respective one of optical splitters 409, which includes optical splitter 409-1 through 409-N. A first portion of the laser light from each of lasers 401, e.g., approximately half thereof, that is output from optical splitters 409 is supplied to a respective one of athermal-sensor-based sensors, which includes one of configurable athermal optical filters 411, in accordance with an aspect of the invention. Such configurable athermal optical filters are disclosed by us in copending U.S. patent application Ser. No. 15/219,720 entitled Reconfigurable Athermal Optical Filters filed on Jul. 26, 2016, which is incorporated by reference as if fully set forth herein. A second portion of the laser light from each of lasers 401, e.g., approximately half thereof, that may be output from each of optical splitters 409 is supplied to a respective one of photodiodes 413, which includes photodiodes 413-1 through 413-N. After passing through its respective one of athermal optical filters 411, the now filtered first portion of the laser light from each of lasers 401 that was output from the respective corresponding one of optical splitters 409 is supplied to a respective one of photodiodes 415, which includes photodiodes 415-1 through 415-N.

Each of configurable athermal optical filters 411 is a configurable athermal bandpass filter which may have a number of passbands having a periodicity for the bands that are passed, i.e., a free spectral range (FSR) may be based on an athermal Mach-Zehnder interferometer. Note that such filters are considered to be athermal with respect to a prescribed temperature operating range in a specific frequency range and essentially only one specific frequency point is actually perfectly athermal. The filter is configurable in that it can be adjusted to have its perfectly athermal frequency range set to a specified frequency range. In addition, the frequencies corresponding to the minima and maxima of the transmission of the configurable athermal filter can be tuned by phase shifters incorporated into the arms of the Mach-Zehnder interferometer.

Each of athermal-filter-based locking sensors 408 may take on any of the configurations and operate generally in the same manner as athermal-filter-based locking sensor 108 described hereinabove. The error signal developed by each of athermal-filter-based locking sensors 408 may be used to lock the frequency of its corresponding one of lasers 401 in the same manner that frequency laser 101-1 is locked using athermal filter 111. This would include any necessary calibration prior to locking during operation of optic. However, each of configurable athermal filters 411 within athermal-filter-based locking sensors 408 is configured to provide athermal operation range around the specific frequency for the grid point that the light passing through it needs to be locked to. This filter tuning is typically accomplished using phase shifters in the tunable athermal filter.

In operation, each of the carrier frequencies of lasers 401 is locked to its desired frequency using one of configurable athermal filters 411 in any manner described hereinabove with regard to laser 101-1 and athermal filter 111. When this occurs, it indicates that the signal output by the respective one of lasers 401 matches the frequency of the filtered version of the signal that is supplied as an output by configurable athermal filter 411. Given that each configurable athermal filter 411 was calibrated relative the desired optical grid, e.g., the ITU grid, each of lasers 401 is now generating a signal in alignment with the grid, i.e., locked at the desired grid frequency for its particular wavelength.

Controller 407 has various parameters based on precharacterization of each of configurable athermal filters 411 which are used to send control signals in order to place each of configurable athermal filters 411 in the desired operating state. Thus, controller 407 may select the athermal operating frequency range for each of configurable athermal filters 411 and tune the frequency corresponding either to the maximum or to the minimum of the transmission of each of configurable athermal filters 411.

Also, each of configurable athermal filters 411 may have one or more built in photodiodes coupled to an optical tap to measure the optical signal so that an electrical error signal or there can a measurement of the electrical signal driving the filter to provide a feedback signal can be fed back to controller 407 to be used by it to maintain the athermal operation. Alternatively, controller 407 can monitor one or more control signals, e.g., the currents, that are supplied to each athermal filter 411 in response to the one or more control signals, e.g., the voltages, supplied by controller 407 for controlling the athermal operating range.

Figure 5:
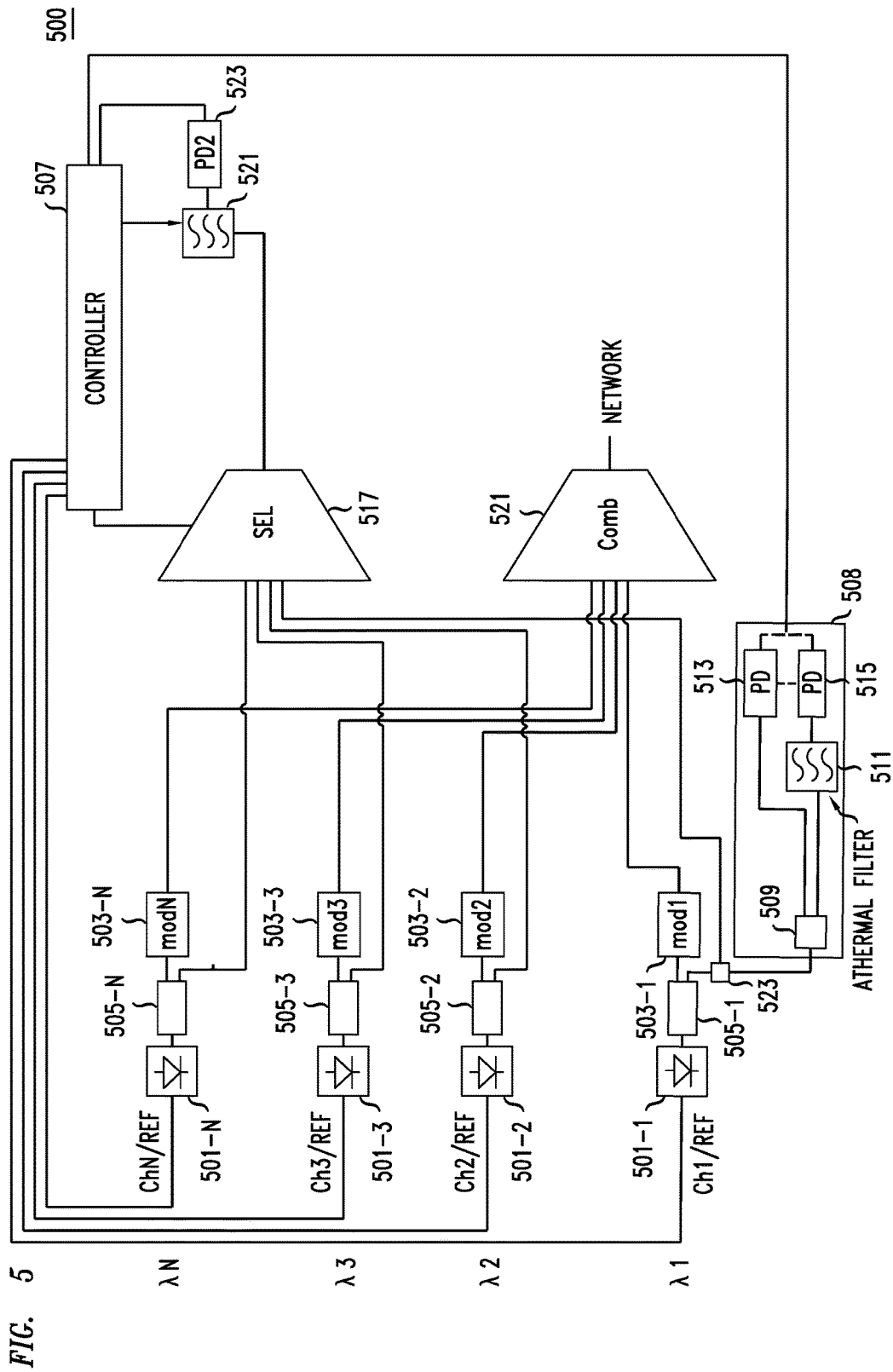
FIG. 5 shows yet another illustrative multiple wavelength optical transmitter arranged in accordance with the principles of the disclosure.

FIG. 5 shows illustrative multiple wavelength optical transmitter 500, e.g., a WDM or DWDM transmitter, arranged in accordance with the principles of the disclosure. Transmitter 500 is arranged to transmit up to N different wavelengths, e.g., wavelengths λ1 through λN, over each of a respective channel, channel 1 (Ch1) through channel N (ChN). To this end, each channel has its carrier generated by a respective one of tunable lasers 501-1 through 501-N, collectively lasers 501. Laser 501-1 generates the carrier for Ch1, laser 501-2, generates the carrier for Ch2, and so forth through laser 501-N which generates the carrier for ChN. The frequency of each of lasers 501 may be individually tunable, e.g., in response to a control signal, e.g., from controller 507.

The laser light output from each of lasers 501 is coupled to a respective one of splitters 505-1 through 505-N, collectively splitters 505. Each of splitters 505 divides the light from laser 501-1 into two portions. A first portion of the laser light output from each of optical splitters 505, typically most of the light, e.g., in a range of 90% to 99%, is supplied to a respective one of modulators 503, which includes modulators 503-1 through 503-N. This portion is primarily used ultimately for transmission over an optical network. For example, the light from laser 501-1 is coupled via splitter 505-1 to modulator 503-1, the light from laser 501-2 is coupled via splitter 505-2 to modulator 503-2, and so forth until laser 501-N has its laser light coupled via splitter 505-N to modulator 503-N.

Modulators 503 each modulate the received laser light with a respective data signal that is supplied to each of modulators 503 but is not shown in FIG. 5 for clarity. Such optical modulators are well known in the art.

A second, remaining portion of the laser light from each of lasers 501-2 through 501-N, e.g., complementary to the first range, e.g., 1% to 10%, that is output from optical splitters 505-2 through 502-N is supplied to selector 517.

A second, remaining portion of the laser light from laser 501-1, e.g., complementary to the first range, e.g., 1% to 10%, that is output from optical splitter 505 is supplied to optical splitter 523. A first portion of the light output from optical splitter 523, e.g., in the range of 1% to 10% is supplied to selector 517. A second portion of the light output from optical splitter 523, e.g., in the range of 90% to 99% is supplied to athermal-filter-based locking sensor 508. In one illustrative arrangement shown in FIG. 5, light supplied from optical splitter 523 to athermal-filter-based locking sensor 108 goes to optical splitter 509. A first portion of the laser light from laser 501-1, e.g., approximately half thereof, that is output from optical splitter 509 is supplied to athermal optical filter 511, in accordance with an aspect of the invention. A second portion of the laser light from laser 501-1, e.g., approximately half thereof, that is output from optical splitter 509 is supplied to photodiode 513. After passing through athermal optical filter 511, the now filtered first portion of the laser light from laser 501-1 that is output from optical splitter 509 is supplied to photodiode 515.

The components of athermal-filter-based locking sensor 508 may be analogous to the components of athermal-filter-based locking sensor 108 of FIG. 1. As such the locking of laser 501-1 to a frequency of the grid, e.g., the ITU grid frequency for λ1, is performed in generally the same manner as for laser 101-1 using calibration and error signal feedback.

The modulated optical signals supplied as output by each of modulators 503 are coupled to combiner 517 which multiplexes them together. A multiplexed optical signal which is a combination of all of the optical signals supplied as outputs by modulators 503 is supplied as an output from combiner 517. This combined optical signal is supplied as an output to the optical network (not shown).

Selector 517 is able to controllably supply, e.g., in response to a signal from controller 507, one of its inputs as an output that is supplied to tunable optical filter 521.

Tunable optical filter 521 may be of the same type as tunable optical filter 121. The filtered output of optical filter 521 is supplied to photodiode 523, which converts the filtered optical signal into a corresponding electrical signal which is supplied as an input to controller 507.

Controller 507 receives the output of photodiode 523, which is an electrical representation of the output of optical filter 521, and performs an analog to digital conversion thereon. The resulting signal is a digital time domain representation of the output of optical filter 521.

Dither signals may be impressed on each of the carriers generated by lasers 501 in a similar manner to that explained hereinabove with regard to lasers 101. Thus, the same techniques described hereinabove to lock filter 521 to the frequency of laser 501-1 and to then lock the remaining lasers is generally applicable. However, given that selector 517 may pass only a single carrier at a time, it may not be necessary to perform an FFT to separate the dither signals if employed, as the selector already does this. Thus, the same dither signal may be impressed on each carrier, rather than requiring unique dither signals as was required in connection with optical transmitter 101. Furthermore, it is possible to dither the location of the transmission spectrum of filter 521, i.e., dither its transmission maxima/minima, rather than the optical carriers. Advantageously, the need to dither the lasers is avoided, so that there are less imperfections introduced to the modulated signal. Locking techniques that do not require any dithering are also possible. Again, advantageously, the need to dither the lasers is avoided, so that there are less imperfections introduced to the modulated signal.

In various implementations there may be empty locations on the grid. Likewise, an irregular frequency spacing may be employed To that end, one may employ an irregular FSR filter as optical filter 121 or 521, or one may employ a regular FSR filter and use irregular locking points for the various frequencies.

Some or all of the elements of optical transmitters 100, (FIG. 1) 400 (FIG. 4) and 500 (FIG. 5), including their various athermal filters, may be manufactured on a silicon photonic integrated circuit.

FIG. 6 shows a flow chart for an exemplary process indicating conceptually how to lock the frequencies of at least two carriers to a grid in accordance with the principles of the disclosure. The process of FIG. 6 would preferably be carried out in connection with an optical transmitters 100 (FIG. 1) or 500 (FIG. 5) an part of the process is applicable to optical transmitter 400. The process of FIG. 6 begins after fabrication of the particular system in which the method is to be carried out. In step 601 the athermal filter of the optical transmitter, e.g., athermal filter 111 (FIG. 1), athermal filter 511 (FIG. 5), or any of athermal filters 411 (FIG. 4), is characterized to determine its athermal operating region, e.g., as described hereinabove. Next, in step 603 of FIG. 6, a reference frequency that is on the desired grid and is in or sufficiently close to the determined athermal operating region is selected, e.g., as described hereinabove. Thereafter, in step 605 the athermal filter is characterized to align its transfer function so that the selected reference frequency corresponds to a desired point on the transfer function of the athermal filter, e.g., as described hereinabove.

In step 607, the various lasers, e.g., lasers 101 (FIG. 1), 401 (FIG. 4), or 501 (FIG. 5) generate carriers near the grid frequencies to which they are to be eventually locked. In step 609 the laser generating the reference frequency is locked to its desired grid frequency using an athermal filter, e.g., as described hereinabove. After completing this step, lasers 101-1 (FIG. 1) and 501-1 are locked to a desired grid frequency.

Using the locked reference carrier, in step 611 the transfer function of grid alignment filter, e.g., filter 121 of FIG. 1 or filter 521 of FIG. 5, is locked to the reference frequency, e.g., as described hereinabove. Lastly, in step 613, the carriers other than the reference carrier are locked to their desired respective grid points using grid alignment filter, e.g., as described hereinabove. Upon conclusion of step 613 all of the carriers should be aligned with their desired grid points. Steps 607 through 613 may be repeated to keep all of the carriers locked to their desired grid points.

Furthermore, step 601 through 609 may be performed for each of lasers 401 (FIG. 4) to lock them to a desired grid frequency. Step 605 may also include configuring the operating range of each of athermal filters 401.

What is claimed is:

1. Apparatus for locking each respective frequency of a plurality of optical carriers to a respective point on a prescribed grid which defines a target frequency set for the optical carriers, the apparatus comprising:
a plurality of tunable lasers, each generating a respective one of the plurality of optical carriers;
an athermal optical filter optically coupled to receive a portion of light of a first optical carrier generated by a first one of the plurality of lasers, the athermal filter being substantially calibrated to the grid and capable of exhibiting substantially athermal behavior in a frequency range that includes a target frequency of the first optical carrier, the target frequency being a frequency on the prescribed grid, wherein the frequency range in which the athermal filter exhibits substantially athermal behavior is selectable after manufacture of the athermal filter is complete;
a detector configured to receive light output by the athermal filter and to generate an error signal indicative of a deviation of the light generated by the first of the plurality of tunable lasers from the target frequency, wherein the error signal is adapted for use as a feedback signal to control the tuning of the first one of the plurality of lasers so as to lock the first optical carrier substantially to the target frequency on the prescribed grid.

2. The invention as defined in claim 1 further comprising a controller, the controller configured to receive the error signal as an input and to supply as an output a tuning signal useable to adjust the carrier frequency of the first one of the plurality of lasers.

3. The invention as defined in claim 2 wherein the controller is configured to supply as an output at least one control signal adapted to cause a dither signal to be impressed on one or more of the optical carriers.

4. The invention as defined in claim 2 wherein the controller is configured to supply as an output at least one control signal adapted to cause a different dither signal to be impressed on each of at least two of the optical carriers.

5. The invention as defined in claim 2 further comprising:
a tunable free spectral range bandpass filter that receives a version of at least a first one of the optical carriers generated by the plurality of tunable lasers and a filter tuning signal, wherein the tunable free spectral range bandpass filter is configured to simultaneously control the frequencies of the peaks of the tunable free spectral range bandpass filter in response to the filter tuning signal; and
wherein the controller is configured to receive a representation of the output of the tunable free spectral range bandpass filter and is further configured to generate the filter tuning signal based on the received representation.

6. The invention as defined in claim 1 further comprising a second athermal optical filter optically coupled to receive a portion of light of a second optical carrier generated by a second one of the plurality of lasers, the second athermal filter being substantially calibrated to the grid and capable of exhibiting substantially athermal behavior in a frequency range that includes a target frequency of the second optical carrier, the target frequency of the second optical carrier being a frequency on the prescribed grid;
a detector configured to receive light output by the second athermal filter and to generate a second error signal indicative of a deviation of the light generated by the second of the plurality of tunable lasers from its target frequency, wherein the second error signal is adapted for use as a feedback signal to control the tuning of the second one of the plurality of tunable lasers to lock the second optical carrier substantially to the target frequency on the prescribed grid for the second one of the plurality of tunable lasers.

7. The invention as defined in claim 1 further comprising a plurality of modulators, each modulator configured to receive a version of a respective one of the plurality of carriers and a respective data signal, and wherein each modulator of the plurality is configured to modulate its respective received version of one of the plurality of carriers with the respective data signal received by it.

8. The invention as defined in claim 1 further comprising a combiner configured to multiplex together a version of each of at least two of the optical carriers generated by the plurality of tunable lasers.

9. The invention as defined in claim 1 further comprising a combiner configured to multiplex together a version of each of at least two of the optical carriers generated by the plurality of tunable lasers, wherein the version of each of at least two of the optical carriers generated by the plurality of tunable lasers has data modulated thereon.

10. The invention as defined in claim 1 further comprising a tunable free spectral range bandpass filter that receives a version of at least one of the optical carriers generated by the plurality of tunable lasers.

11. The invention as defined in claim 1 wherein the plurality of tunable lasers, the athermal filter, and the detector are integrated on the same integrated photonic integrated circuit.

12. The invention as defined in claim 1 further comprising:
a selector configured to receive a version of at least two carriers of the plurality and to select one of the received versions to supply as an output; and
a tunable free spectral range bandpass filter that receives the output of the selector.

13. The invention as defined in claim 1 further comprising a tunable free spectral range bandpass filter that receives a version of at least the first one of the optical carriers generated by the plurality of tunable lasers and a filter tuning signal, wherein the tunable free spectral range bandpass filter is configured to simultaneously control the frequencies of the transmission peaks of the tunable free spectral range bandpass filter in response to the filter tuning signal.

14. The invention as defined in claim 13 wherein the filter tuning signal is based on an electrical representation of the version of the first one of the optical carriers after passing through the tunable free spectral range bandpass filter and after the first one of the optical carriers was locked to a grid frequency by employing the athermal filter.

15. The invention as defined in claim 13 wherein the apparatus is configured such that the filter tuning signal is developed after the first one of the plurality of lasers is locked substantially to a grid frequency based on light output by the athermal filter.

16. The invention as defined in claim 13 wherein the filter tuning signal is based on a received representation of an output of the tunable free spectral range bandpass filter.

17. The invention as defined in claim 13 wherein the tunable free spectral range bandpass filter is configured to receive as an input at least a version of a second optical carrier of the plurality of optical carriers other than the first optical carrier, and wherein the one of the plurality of lasers generating the second optical carrier is configured to receive as an input a laser tuning signal, the one of the plurality of lasers generating the second optical carrier being further configured to adjust the frequency of the second optical carrier based on the laser tuning signal so as to lock the second optical carrier to a target grid point for the second optical carrier that is different from the grid point of the first optical carrier, the laser tuning signal being a function of an output of the tunable free spectral range bandpass filter.

18. The invention as defined in claim 13 wherein a version of an optical carrier generated by at least one of the plurality of tunable lasers other than the first one of the tunable lasers as filtered by the tunable free spectral range bandpass filter has impressed thereon a distinguishable dither signal, and wherein the controller adjusts the tuning signal supplied to the at least one of the plurality of tunable lasers other than the first one of the plurality of lasers so as to achieve a prescribed optimization for the dither signal.

19. The invention as defined in claim 1 further comprising:
a tunable free spectral range bandpass filter that receives a version of at least one of the optical carriers generated by at least one of the plurality of tunable lasers other than the first one of the tunable lasers;
an optical to electrical converter; and
a controller;
wherein the controller is configured to receive an electrical representation of a version of the optical carrier generated by the at least one of the plurality of lasers other than the first one of the tunable lasers as filtered by the tunable free spectral range bandpass filter and to supply to the at least one of the plurality of lasers other than the first one of the plurality of lasers a tuning signal which is developed by the controller as a function of the received electrical representation of the version of the optical carrier generated by the at least one of the plurality of lasers other than the first one of the plurality of lasers as filtered by the tunable free spectral range bandpass filter.

20. A method for locking each respective frequency of a plurality of optical carriers that are each generated by a respective one of a plurality of tunable lasers to points on a prescribed frequency grid which defines a target frequency set for the optical carriers, the method comprising the steps of:
locking a first one of the carriers of the plurality to a target frequency for the first one of the carriers that corresponds to a first point on the grid using an athermal optical filter, the athermal optical filter being substantially calibrated to the grid and exhibiting substantially athermal behavior in a frequency range that includes the target frequency for the first optical carrier;
locking a second one of the carriers of the plurality to a second target frequency corresponding to a second point on the grid that is different from the first point using a tunable free spectral range bandpass filter which has its transfer function set based on the locked first one of the carriers.

21. The invention as defined in claim 20 wherein locking the first one of the carriers of the plurality to the grid using an athermal optical filter further comprises:
generating an error signal indicative of a deviation of the first optical carrier from its target frequency, the error signal being a function of a version of the first one of the carriers after passing through the athermal optical filter;
tuning the first one of the plurality of lasers in response to the error signal so that the first optical carrier is locked substantially to its target frequency.

22. The invention as defined in claim 20 wherein locking a second one of the carriers further comprises:
passing a version of the second optical carrier of the plurality of optical carriers through the tunable free spectral range bandpass filter; and
adjusting the frequency of the second optical carrier based on the output of the tunable free spectral range bandpass filter.

23. The invention as defined in claim 20 further comprising the step of:
calibrating the athermal filter to align a prescribed point of its transfer function with a point on the grid.

24. The invention as defined in claim 20 further comprising the step of:
selecting the first point based on a characterization of an athermal operating range of the athermal filter.

25. A photonic integrated circuit for use in providing a plurality of optical carriers that each has a frequency locked to a point on a prescribed grid that defines a target frequency set for the optical carriers, the photonic integrated circuit comprising:
a plurality of tunable lasers, each generating a respective one of the plurality of optical carriers;
an athermal optical filter optically coupled to receive a portion of light of a first optical carrier generated by a first one of the plurality of lasers, the athermal filter being substantially calibrated to the grid and exhibiting substantially athermal behavior in a frequency range that includes a target frequency of the first optical carrier, the target frequency being a frequency on the prescribed grid;
a detector configured to receive light output by the athermal filter and to generate an error signal indicative of a deviation of the light generated by the first of the plurality of tunable lasers from the target frequency on the grid, wherein the error signal is adapted to be used as a feedback signal to control the tuning of the first one of the plurality of lasers so as to lock the first optical carrier substantially to the target frequency on the prescribed grid; and a tunable free spectral range bandpass filter that receives a version of the first optical carrier at and a filter tuning signal, wherein the tunable free spectral range bandpass filter simultaneously controls the frequencies of the peaks of the tunable free spectral range bandpass filter in response to the filter tuning signal;

wherein the filter tuning signal is developed based on the version of the first optical carrier after passing through the tunable free spectral range bandpass filter and after the first optical carrier was locked to the target frequency for the first optical carrier by employing the athermal filter;

wherein at least a version of a second optical carrier of the plurality of optical carriers other than the first optical carrier is received by the tunable free spectral range bandpass filter; and wherein the one of the plurality of tunable lasers generating the second optical carrier receives a tuning signal to adjust the frequency of the second optical carrier based on the output of the tunable free spectral range bandpass filter so as to lock the second optical carrier to a target grid point for the second optical carrier that is different from the grid point to which the first optical carrier was locked.

* * * * *